US010968865B2

(12) United States Patent
Gotzig et al.

(10) Patent No.: US 10,968,865 B2
(45) Date of Patent: Apr. 6, 2021

(54) ROCKET PROPULSION SYSTEM AND METHOD FOR OPERATING A ROCKET PROPULSION SYSTEM

(71) Applicant: Airbus DS GmbH, Taufkirchen (DE)

(72) Inventors: Ulrich Gotzig, Bad Friedrichshall (DE); Malte Wurdak, Moeckmuehl (DE); Joel Deck, Neudenau (DE); Manuel Frey, Munich (DE)

(73) Assignee: ARIANEGROUP GMBH, Taufkirchen (DE)

( * ) Notice: Subject to any disclaimer, the term of this patent is extended or adjusted under 35 U.S.C. 154(b) by 610 days.

(21) Appl. No.: 15/597,922

(22) Filed: May 17, 2017

(65) Prior Publication Data

US 2017/0335799 A1 Nov. 23, 2017

(30) Foreign Application Priority Data

May 20, 2016 (DE) .......................... 102016208731.2

(51) Int. Cl.
*F02K 9/68* (2006.01)
*F02K 9/64* (2006.01)
(Continued)

(52) U.S. Cl.
CPC ................ *F02K 9/64* (2013.01); *F02K 9/425* (2013.01); *F02K 9/44* (2013.01); *F02K 9/68* (2013.01);
(Continued)

(58) Field of Classification Search
CPC ..... F02K 9/68; F02K 9/40; F02K 9/95; F02K 9/64; F02K 9/425; F02K 9/44
See application file for complete search history.

(56) References Cited

U.S. PATENT DOCUMENTS 3,520,137 A * 7/1970 Newman ................. C06B 47/12
60/221
4,841,723 A 6/1989 Lau et al.
(Continued)

FOREIGN PATENT DOCUMENTS

DE 1071421 11/1956
RU 2215891 C2 11/2003

OTHER PUBLICATIONS

German Search Report, dated Feb. 6, 2017, priority document.
(Continued)

*Primary Examiner* — Todd E Manahan
*Assistant Examiner* — Kyle Robert Thomas
(74) *Attorney, Agent, or Firm* — Greer, Burns & Crain, Ltd.

(57) ABSTRACT

A rocket propulsion system comprises a combustion chamber, an oxygen supply system, comprising an oxygen supply duct and being configured to supply oxygen to the combustion chamber, and a hydrogen supply system, comprising a hydrogen supply duct and being configured to supply hydrogen to the combustion chamber. An ignition unit of the propulsion system, to which at least portions of the oxygen and the hydrogen supplied to the combustion chamber can be supplied, is configured to initiate combustion of the oxygen-hydrogen mixture in the combustion chamber. The propulsion system further comprises a cooling duct extending along an inner surface of a combustion chamber wall and through which at least a portion of the oxygen supplied to the combustion chamber, at least a portion of the hydrogen supplied to the combustion chamber or a combustion gas mixture emerging from the ignition unit flows.

13 Claims, 7 Drawing Sheets

(51) Int. Cl.
*F02K 9/95* (2006.01)
*F02K 9/42* (2006.01)
*F02K 9/44* (2006.01)

(52) U.S. Cl.
CPC ............ *F02K 9/95* (2013.01); *F05D 2220/80* (2013.01); *F05D 2240/35* (2013.01); *F05D 2260/202* (2013.01); *F05D 2260/2212* (2013.01)

(56) References Cited

U.S. PATENT DOCUMENTS

| | | | | |
|---|---|---|---|---|
| 5,148,674 A | * | 9/1992 | Morris | F02K 9/56 60/240 |
| 5,857,323 A | * | 1/1999 | Beveridge | F02K 9/52 239/424.5 |
| 2008/0264035 A1 | * | 10/2008 | Ricciardo | F02K 9/64 60/267 |
| 2008/0264372 A1 | * | 10/2008 | Sisk | F02K 9/42 123/144 |
| 2012/0060464 A1 | | 3/2012 | Grote et al. | |

OTHER PUBLICATIONS

"Space Station Technology Summary", Iacabucci et al., 1989.
NASA Technical Memorandum 113157.
NASA Technical Memorandum 105249.
German Examination Report for corresponding German Patent Application No. 102016208730.4 dated Jul. 15, 2020.
R. Iacabucci et al., "Space Station Technology Summary" JANNAF Propulsion Meeting, vol. 1, Chemical Propulsion Information Agency, Laurel, MD, 1989, pp. 457-470.

* cited by examiner

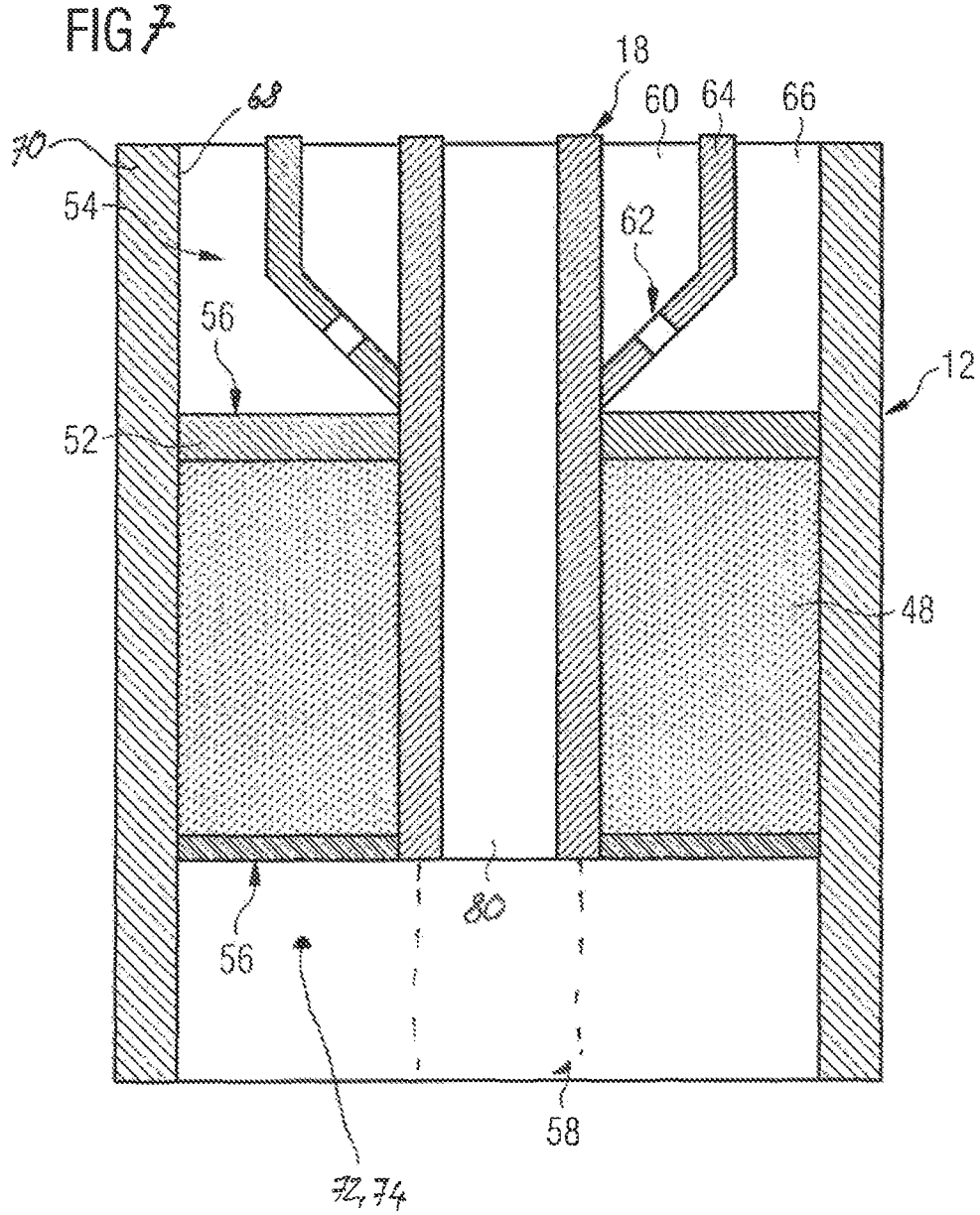

ROCKET PROPULSION SYSTEM AND METHOD FOR OPERATING A ROCKET PROPULSION SYSTEM

CROSS-REFERENCES TO RELATED APPLICATIONS

This application claims the benefit of the German patent application No. 10 2016 208 731.2 filed on May 20, 2016, the entire disclosures of which are incorporated herein by way of reference.

BACKGROUND OF THE INVENTION

The invention relates to a rocket propulsion system and a method for operating such a rocket propulsion system.

Rocket engines operated using hydrogen characterize known propulsion systems for spacecraft. In rocket engines of this kind, hydrogen is burned with oxygen and thrust is generated thereby. These propulsion systems are used, for example, in the launch vehicles of the Ariane series, in which a rocket propulsion system operated using liquid hydrogen and liquid oxygen is formed as the main stage. The hydrogen and the oxygen are stored in hydrogen and oxygen tanks provided for this.

Furthermore, so-called water electrolysis propulsion systems are known, such as from the NASA Technical Memorandum 113157, for example, which can be used in satellites. In a water electrolysis propulsion system of this kind, water is split by electrolysis into hydrogen and oxygen. The hydrogen and oxygen thus produced are then burned in a combustion chamber of an engine to generate thrust. The water to be split by electrolysis can be stored at room temperature, while liquid hydrogen and liquid oxygen have to be stored in cryogenic conditions. This permits a reduced outlay on storage of the water over an entire mission time of several years.

By using hydrogen as fuel in rocket propulsion, a high energy yield and thus a high specific impulse of the rocket propulsion can be attained. However, the disadvantage of this high energy yield is that in the combustion of hydrogen, high combustion temperatures are reached, which in the case of stoichiometric combustion of hydrogen in particular leads to high thermal loading of the materials used in a rocket propulsion. This is a problem in water electrolysis propulsion systems in particular, as here hydrogen and oxygen are produced in a stoichiometric mixture ratio.

To limit the combustion temperatures in such systems, a sub-stoichiometric oxygen-hydrogen mixture is normally burned, such as disclosed in the NASA Technical Memorandum 105249, for example. Any remaining oxygen can then be used as cold gas and discharged to an environment of the water electrolysis propulsion system.

The efficiency to be achieved and the power of such rocket propulsion systems are substantially a function of the mixture ratio of oxygen to hydrogen of the oxygen-hydrogen mixture to be ignited in the combustion chamber.

SUMMARY OF THE INVENTION

An object of the invention is to provide a rocket propulsion system and a method for operating a rocket propulsion system, which facilitate an increase in the power of such rocket propulsion systems with lower thermal loading.

A rocket propulsion system comprises a combustion chamber, which is provided to for the combustion of a fuel mixture. The combustion chamber can be connected to a thruster for generating thrust, to which thruster exhaust gases produced in the combustion chamber by combustion of the fuel mixture are supplied. The thruster can be provided to accelerate the exhaust gases produced in the combustion chamber on their exit from the combustion chamber as far as an exit opening of the thruster and then to discharge them to an environment of the rocket propulsion system at high exit velocities.

The rocket propulsion system is provided for using an oxygen-hydrogen mixture as a fuel mixture, which is burned in the combustion chamber to generate thrust. To supply the oxygen-hydrogen mixture to the combustion chamber, the rocket propulsion system has an oxygen supply system and a hydrogen supply system. The oxygen supply system comprises an oxygen supply duct and is configured to supply oxygen to the combustion chamber. The hydrogen supply system comprises a hydrogen supply duct and is configured to supply hydrogen to the combustion chamber.

An ignition unit of the rocket propulsion system, to which at least a portion of the oxygen supplied to the combustion chamber and at least a portion of the hydrogen supplied to the combustion chamber can be supplied, is configured to initiate combustion of the oxygen-hydrogen mixture in the combustion chamber.

The rocket propulsion system further comprises a cooling duct, which extends along an inner surface of a combustion chamber wall and through which at least a portion of the oxygen supplied to the combustion chamber, at least a portion of the hydrogen supplied to the combustion chamber or a combustion gas mixture emerging from the ignition unit can flow.

The rocket propulsion system proposed here makes it possible that in operation of the rocket propulsion system, the gases flowing through the cooling duct flow along the inner surface of the combustion chamber wall, at least in sections, and thus cool the combustion chamber wall. The gases flowing through the cooling duct and along the inner surface of the combustion chamber wall are accordingly termed "cooling film" here. The cooling film formed by the gases flowing through the cooling duct has the effect that a thermal load on the combustion chamber wall during the operation of the rocket propulsion system is reduced. In particular, the rocket propulsion system can be formed so that the cooling film encloses a gas core in the combustion chamber, which core has higher combustion temperatures compared with the cooling film. The cooling film can thus provide thermal insulation between the combustion chamber wall and the gas core having higher combustion temperatures.

This makes it possible for higher combustion temperatures to be attained in the combustion chamber in comparison to known rocket propulsions without exceeding a permissible thermal loading of the materials used in the combustion chamber by this. The rocket propulsion system can be configured accordingly to be operated by an oxygen-hydrogen mixture, which in comparison to known rocket propulsion systems has a higher mass mixing ratio of oxygen to hydrogen, in particular a mass mixing ratio that lies closer to a stoichiometric mass mixing ratio. Thus, a higher power and a higher specific impulse of the rocket propulsion system can be attained.

Because at least a portion of the hydrogen supplied to the combustion chamber or the combustion gas mixture emerging from the ignition unit can flow through the cooling duct, the gases flowing through the cooling duct can in particular form a reactive cooling film, i.e., a low-oxidizer cooling film, along the inner surface of the combustion chamber wall. This has the effect that reductive conditions can prevail along the combustion chamber wall and thus a reaction of the combustion chamber wall with oxygen can be prevented. At the same time, lower combustion temperatures can be reached by this in the region of the combustion chamber wall in operation of the rocket propulsion system. In this case the reactive cooling film can in particular enclose an oxygen-rich gas core.

Downstream of an exit area of the ignition unit in the combustion chamber, a combustion section of the combustion chamber can be arranged. The term "downstream" refers here to the direction of the gases exiting the ignition unit. The gases emerging from the ignition unit, a further portion of the oxygen supplied to the combustion chamber and/or a further portion of the hydrogen supplied to the combustion chamber can be able to be supplied to the combustion section.

The cooling duct can be configured to conduct gases flowing through the cooling duct in operation of the rocket propulsion system in such a way in the combustion chamber that the cooling film formed by the gases flowing through the cooling duct forms in the combustion section along the inner surface of the combustion chamber wall, in particular in the region of the exit surface of the ignition unit. The cooling film can enclose the gas core in the combustion section of the combustion chamber, in particular in the region of the exit area of the ignition unit, wherein the gas core is formed by at least a portion of the gases flowing through the combustion section of the combustion chamber. The gases forming the gas core can differ from the gases forming the cooling film in the combustion section of the combustion chamber, in particular relative to their chemical composition and their temperature. The gases forming the gas core preferably have a higher temperature compared with the gases forming the cooling film in the region of the inner surface of the combustion chamber wall.

The cooling duct can comprise a first section, which extends along the inner surface of the combustion chamber wall in the combustion section of the combustion chamber arranged downstream of the exit area of the ignition unit. The cooling duct can be formed so that the cooling film is formed in the first section of the cooling duct along the inner surface of the combustion chamber wall.

As described above, the combustion gas mixture emerging from the ignition unit can flow through the cooling duct. To this end the first section of the cooling duct can be connected to the exit area of the ignition unit. In particular, the exit area of the ignition unit can open into the first section of the cooling duct and be arranged perpendicular to the first section of the cooling duct.

Alternatively, the first section of the cooling duct can be connected to the oxygen supply system or the hydrogen supply system, so that the oxygen supplied to the combustion chamber or the hydrogen supplied to the combustion chamber can flow through the cooling duct.

In a further development, the cooling duct can comprise a second section, which extends between an outer surface of the ignition unit and a section of the inner surface of the combustion chamber wall lying opposite the outer surface of the ignition unit. The second section of the cooling duct can be formed in the form of an annular gap defined between the outer surface of the ignition unit and the section of the inner surface of the combustion chamber wall lying opposite the outer surface of the ignition unit. In other words, the second section of the cooling duct can be configured to conduct the gases flowing through the second section of the cooling duct along the outer surface of the ignition unit. This has the effect that the gases flowing through the second section of the cooling duct, in particular the oxygen or hydrogen flowing through the second section of the cooling duct, are heated by flowing along the outer surface of the ignition unit and can thus cool the ignition unit.

The second section of the cooling duct can open into the combustion section of the combustion chamber arranged downstream of the exit area of the ignition unit, in particular into the first section of the cooling duct.

So that the oxygen supplied to the combustion chamber or the hydrogen supplied to the combustion chamber can flow through the cooling duct, the cooling duct, in particular the second section of the cooling duct, can be connected to the oxygen supply system or to the hydrogen supply system. In particular, the cooling duct, in particular the second section of the cooling duct, can be connected to the oxygen supply duct of the oxygen supply system or the hydrogen supply duct of the hydrogen supply system.

A swirl generation means, in particular a swirler, can further be provided in the cooling duct, in particular in the second section of the cooling duct. Alternatively, the swirl generation means can be provided in the form of tangentially positioned holes provided in the cooling duct. The swirl generation means can be configured to induce swirl in the gases flowing through the cooling duct. This has the effect on one hand that the dwell time in the cooling duct of the gases flowing through the cooling duct is increased and thus the cooling function provided for the ignition unit is improved. On the other hand, a more stable formation of the cooling film can be achieved by this in the combustion section.

Alternatively or in addition, a plurality of individual flow paths through which a parallel flow, in particular, is possible can be provided in the second section of the cooling duct, in particular.

To supply oxygen to the cooling duct, the cooling duct can be connected to the oxygen supply system. The oxygen supply system can be provided so that the oxygen supply duct of the oxygen supply system opens into the cooling duct, in particular into the second section of the cooling duct. Alternatively, the cooling duct, in particular the second section of the cooling duct, can branch off from the oxygen supply duct of the oxygen supply system and run, in particular, along at least a partial area of the cooling duct, in particular of the second section of the cooling duct, parallel to the oxygen supply duct.

Alternatively, the cooling duct can be connected to the hydrogen supply system, in order that the hydrogen supplied to the combustion chamber can flow through it. The hydrogen supply system can accordingly be provided so that the hydrogen supply duct of the hydrogen supply system opens into the cooling duct, in particular into the second section of the cooling duct. The cooling duct, in particular the second section of the cooling duct, can further branch off from the hydrogen supply duct of the hydrogen supply system and run, in particular, along at least a partial area of the cooling duct, in particular of the second section of the cooling duct, parallel to the hydrogen supply duct.

To initiate the combustion of the oxygen-hydrogen mixture introduced into the combustion chamber, the ignition unit is provided in the rocket propulsion system. The ignition unit of the rocket propulsion system can comprise a catalyst chamber, to which the oxygen supplied to the ignition unit and the hydrogen supplied to the ignition unit can be supplied. The catalyst chamber is preferably configured to initiate combustion of the oxygen-hydrogen mixture introduced into the catalyst chamber by means of a catalyst.

In other words, the catalyst chamber can form a flow section of an oxygen-hydrogen mixture formed from at least a portion of the oxygen conducted into the combustion chamber and at least a portion of the hydrogen conducted into the combustion chamber. This flow section formed by the catalyst chamber, in which section the activation energy for initiating the combustion of the oxygen-hydrogen mixture supplied to the catalyst chamber is reduced by the catalyst, is preferably configured to ignite catalytically the oxygen-hydrogen mixture flowing through the catalyst chamber. The catalyst chamber can further be formed so that the gases emerging from the catalyst chamber into the combustion section have a temperature that is adequate for initiating the combustion of the oxygen-hydrogen mixture introduced into the combustion chamber. The use of a catalyst chamber has the effect of a stable ignition of the oxygen-hydrogen mixture conducted into the combustion chamber.

The rocket propulsion system is preferably configured so that in operation of the rocket propulsion system, oxygen supplied to the combustion chamber and hydrogen supplied to the combustion chamber can be supplied to the ignition unit, in particular the catalyst chamber of the ignition unit, in a sub-stoichiometric mass mixing ratio, in particular in a mass mixing ratio of oxygen to hydrogen of less than or equal to 2. This has the effect that the fatigue strength of the catalyst used in the catalyst chamber can be increased.

In a further development, the ignition unit can comprise a premixing chamber for premixing the oxygen supplied to the ignition unit and the hydrogen supplied to the ignition unit prior to supplying the oxygen-hydrogen mixture to the catalyst chamber. In other words, the premixing chamber can be configured to mix the oxygen to be supplied to the catalyst chamber and the hydrogen to be supplied to the catalyst chamber with one another to produce the oxygen-hydrogen mixture to be introduced into the catalyst chamber. The premixing chamber can be arranged upstream of an entrance area to the catalyst chamber, via which oxygen and hydrogen can be supplied to the catalyst chamber, and, in particular, can open into the entrance area to the catalyst chamber. The term "upstream" refers here to the direction of the gases flowing through the catalyst chamber. Furthermore, the premixing chamber can be formed in such a way that it has a flow cross section for the gases to be supplied to the catalyst chamber that becomes larger in the flow direction. The oxygen-hydrogen mixture flowing through the premixing chamber can thus be expanded and decelerated, which can lead to an improved mixing of the oxygen-hydrogen mixture.

In a further development, a flashback arrestor can be arranged in the region of the entrance area of the catalyst chamber. The flashback arrestor can be configured to prevent an ignition upstream of the catalyst chamber of the oxygen-hydrogen mixture to be supplied to the catalyst chamber.

To supply oxygen to the ignition unit, in particular to the premixing chamber of the ignition unit, an oxygen supply opening can be formed in a wall of the premixing chamber facing the oxygen supply duct of the oxygen supply system. Correspondingly, to conduct hydrogen into the ignition unit, in particular into the premixing chamber of the ignition unit, the hydrogen supply duct of the hydrogen supply system can open into the ignition unit, in particular into the premixing chamber of the ignition unit and run in particular perpendicular to the entrance area of the catalyst chamber. Alternatively, a hydrogen supply opening for supplying hydrogen to the ignition unit, in particular to the premixing chamber of the ignition unit, can be formed in a wall of the premixing chamber facing the hydrogen supply duct of the hydrogen supply system.

In a further development, a core duct can pass through the ignition unit, at least in sections, via which oxygen supplied to the combustion chamber can be supplied to the combustion section. Oxygen supplied to the combustion chamber can accordingly flow through the core duct. To this end, the core duct can be connected to the oxygen supply duct of the oxygen supply system, wherein the oxygen supply duct opens in particular into the core duct. Alternatively, the core duct can branch off from the oxygen supply duct and, in particular, run along at least a partial area parallel to the oxygen supply duct.

The core duct can be configured to conduct the gases flowing through the core duct along an outer surface of an inner wall of the catalyst chamber. This has the effect that gases flowing along the inner wall of the catalyst chamber, in particular oxygen flowing through the core duct, are heated and can thus cool the catalyst chamber.

The rocket propulsion system can further comprise a control unit, which can be configured to control the oxygen supply system and the hydrogen supply system so that the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen, which is greater than the first mass mixing ratio. "Alternating operation" of the rocket propulsion system is understood here to mean an operation in which the rocket propulsion system is operated alternately and repeatedly in the first operating mode and in the second operating mode.

Due to the alternating operation of the rocket propulsion system in the first operating mode, in which oxygen and hydrogen are supplied to the combustion chamber in the first mass mixing ratio, and the second operating mode, in which oxygen and hydrogen are supplied to the combustion chamber in the second mass mixing ratio, an oxygen-hydrogen mixture can be supplied to the combustion chamber that has a higher proportion of oxygen as a whole in comparison to currently known methods. In particular, the method makes it possible to achieve stoichiometric combustion on average without thereby exceeding a permissible thermal loading of the materials used in the combustion chamber. The overall mass flow of gas emerging from the combustion chamber into the thruster and, in particular, the thrust and the power of the rocket propulsion system, can be increased by this.

A method for operating a rocket propulsion system comprises the steps of supplying oxygen to a combustion chamber, of supplying hydrogen to a combustion chamber and of conducting at least a portion of the oxygen supplied to the combustion chamber and at least a portion of the hydrogen supplied to the combustion chamber into an ignition unit. Furthermore, an initiation of combustion of the oxygen-hydrogen mixture in the combustion chamber takes place by means of the ignition unit. At least a portion of the oxygen supplied to the combustion chamber, at least a portion of the hydrogen supplied to the combustion chamber or a combustion gas mixture emerging from the ignition unit are conducted through a cooling duct, which extends along an inner surface of a wall of the combustion chamber.

The cooling duct can comprise a first section, which extends in a combustion section of the combustion chamber arranged downstream of an exit area of the ignition unit along the inner surface of the combustion chamber wall.

Alternatively or in addition, the cooling duct can comprise a second section, which extends between an outer surface of the ignition unit and a section of the inner surface of the combustion chamber wall lying opposite the outer surface of the ignition unit and opens in particular into the combustion section of the combustion chamber arranged downstream of the exit area of the ignition unit.

In a further development, the cooling duct, in particular the second section of the cooling duct, can be connected to an oxygen supply duct of an oxygen supply system or a hydrogen supply duct of a hydrogen supply system. In the cooling duct, in particular the second section of the cooling duct, a swirl generation means, in particular a swirler, can be arranged. Alternatively or in addition, a plurality of individual flow paths, through which an in particular parallel flow is possible, can be provided in the cooling duct, in particular in the second section of the cooling duct.

The oxygen supply duct of the oxygen supply system or the hydrogen supply duct of the hydrogen supply system can further open into the cooling duct, in particular into the second section of the cooling duct. Alternatively, the cooling duct, in particular the second section of the cooling duct, can branch off from the oxygen supply duct or the hydrogen supply duct and run in particular along at least a partial area parallel to the oxygen supply duct of the oxygen supply system or the hydrogen supply duct of the hydrogen supply system.

In a further development, a core duct can pass through the ignition unit, at least in sections, through which duct oxygen to be supplied to the combustion chamber in particular is conducted.

BRIEF DESCRIPTION OF THE DRAWINGS

Preferred embodiments of the invention are explained in greater detail below with reference to the enclosed schematic drawings, wherein FIG. 7 shows a combustion chamber of the rocket propulsion system of a fifth embodiment.

DETAILED DESCRIPTION OF THE PREFERRED EMBODIMENTS

Figure 1:
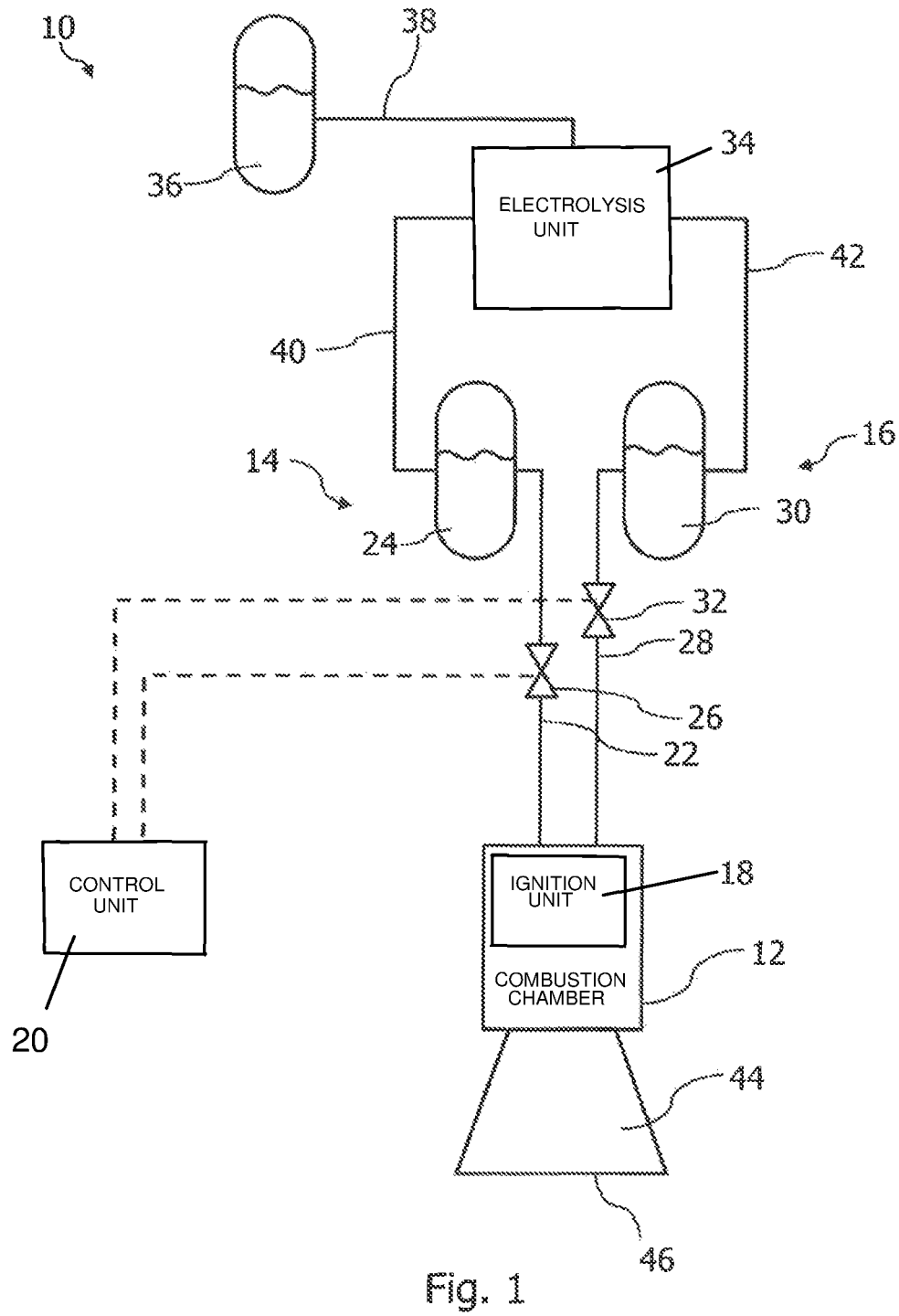
FIG. 1 shows a schematic view of a rocket propulsion system.

FIG. 1 shows a rocket propulsion system 10, which comprises a combustion chamber 12, an oxygen supply system 14 connected to the combustion chamber 12 and a hydrogen supply system 16 connected to the combustion chamber 12. The oxygen supply system 14 is configured to supply oxygen to the combustion chamber 12. Correspondingly the hydrogen supply system 16 is configured to supply hydrogen to the combustion chamber 12. An ignition unit 18 of the rocket propulsion system 10, to which at least a portion of the oxygen supplied to the combustion chamber 12 and at least a portion of the hydrogen supplied to the combustion chamber 12 can be supplied, is configured to initiate combustion of the oxygen-hydrogen mixture in the combustion chamber 12.

The rocket propulsion system 10 further comprises a control unit 20, which is configured to control the oxygen supply system 14 and the hydrogen supply system 16 so that the rocket propulsion system 10 is operated alternately in a first operating mode, in which oxygen and hydrogen are supplied to the combustion chamber 12 in a first mass mixing ratio of oxygen to hydrogen, and in a second operating mode, in which oxygen and hydrogen are supplied to the combustion chamber 12 in a second mass mixing ratio of oxygen to hydrogen, which is greater than the first mass mixing ratio.

The oxygen supply system 14 comprises an oxygen supply line 22 connected to the combustion chamber 12, through which oxygen to be supplied to the combustion chamber 12 can flow. The oxygen supply line 22 is connected to an oxygen storage facility 24 of the oxygen supply system 14 for storing oxygen and is configured to supply oxygen from the oxygen storage facility 24 to the combustion chamber 12. An oxygen supply valve 26 connected to the control unit 20 is provided in the oxygen supply line 22, wherein an oxygen mass flow to be supplied to the combustion chamber 12 can be adjusted by means of the oxygen supply valve 26. The control unit 20 is configured to control the oxygen mass flow to be supplied to the combustion chamber 12 via the oxygen supply valve 26.

The hydrogen supply system 16 comprises a hydrogen supply line 28 connected to the combustion chamber 12, through which hydrogen to be supplied to the combustion chamber 12 can flow. The hydrogen supply line 28 is connected to a hydrogen storage facility 30 of the hydrogen supply system 16 for storing hydrogen and is configured to supply hydrogen from the hydrogen storage facility 30 to the combustion chamber 12. A hydrogen supply valve 32 connected to the control unit 20 is provided in the hydrogen supply line 28, by means of which a hydrogen mass flow to be supplied to the combustion chamber 12 via the hydrogen supply line 28 can be adjusted. The control unit 20 is configured to control the hydrogen mass flow to be supplied to the combustion chamber 12 via the hydrogen supply valve 32.

The oxygen supply system 14 and the hydrogen supply system 16 are connected to an electrolysis unit 34. The electrolysis unit 34 is configured to split water supplied to the electrolysis unit 34 from a water storage facility 36 via a water line 38 into hydrogen and oxygen by electrolysis. A water supply valve connected to the control unit 20 can further be provided in the water line, wherein a water mass flow to be supplied to the electrolysis unit 34 can be adjusted by means of the water supply valve. A non-return valve can also be arranged upstream of the water supply valve, i.e., opposite to the supply direction of the water. The oxygen produced in the electrolysis unit 34 can be supplied to the oxygen storage facility 24 via an oxygen line 40. The hydrogen produced in the electrolysis unit 34 can correspondingly be supplied via a hydrogen line 42 to the hydrogen storage facility 30. A non-return valve can also be provided in the oxygen line 40 and in the hydrogen line 42 respectively.

The combustion chamber 12 of the rocket propulsion system 10 is connected to a thruster 44, to which exhaust gases arising in the combustion chamber 12 due to combustion of the oxygen-hydrogen mixture can be supplied. The thruster 44 is provided to accelerate the exhaust gases produced in the combustion chamber 12 on their exit from the combustion chamber 12 up to an exit opening 46 of the thruster 44 and thereupon to discharge them to an environment of the rocket propulsion system 10 at high exit velocities, in order to generate thrust.

The control unit 20 is preferably configured to control the oxygen supply system 14 and the hydrogen supply system 16 so that the combustion chamber 12 of the rocket propulsion system 10 is supplied in the first operating mode with oxygen and hydrogen in the first mass mixing ratio, wherein the first mass mixing ratio is a sub-stoichiometric mass mixing ratio of oxygen to hydrogen, in particular a mass mixing ratio of less than or equal to 2. In the second operating mode of the rocket propulsion system 10, the control unit 20 is preferably configured to control the oxygen supply system 14 and the hydrogen supply system 16 so that the combustion chamber 12 of the rocket propulsion system 10 is supplied with oxygen and hydrogen in the second mass mixing ratio, wherein the second mass mixing ratio is a super-stoichiometric mass mixing ratio of oxygen to hydrogen, in particular a mass mixing ratio of greater than or equal to 50.

In particular, the control unit 20 can be configured to control the oxygen supply system 14 and the hydrogen supply system 16 so that in the first operating mode of the rocket propulsion system 10, a first hydrogen mass flow is supplied to the combustion chamber 12, which is greater than a second hydrogen mass flow, which is supplied to the combustion chamber 12 in the second operating mode of the rocket propulsion system 10. In particular, the control unit 20 can be configured to control the oxygen supply system 14 and the hydrogen supply system 16 so that the supply of hydrogen to the combustion chamber 12 is interrupted in the second operating mode of the rocket propulsion system 10.

Alternatively or in addition, the control unit 20 can be configured to control the oxygen supply system 14 and the hydrogen supply system 16 so that in the first operating mode of the rocket propulsion system 10, a first oxygen mass flow is supplied to the combustion chamber 12, which is smaller than a second oxygen mass flow, which is supplied to the combustion chamber 12 in the second operating mode of the rocket propulsion system 10.

Figure 2:
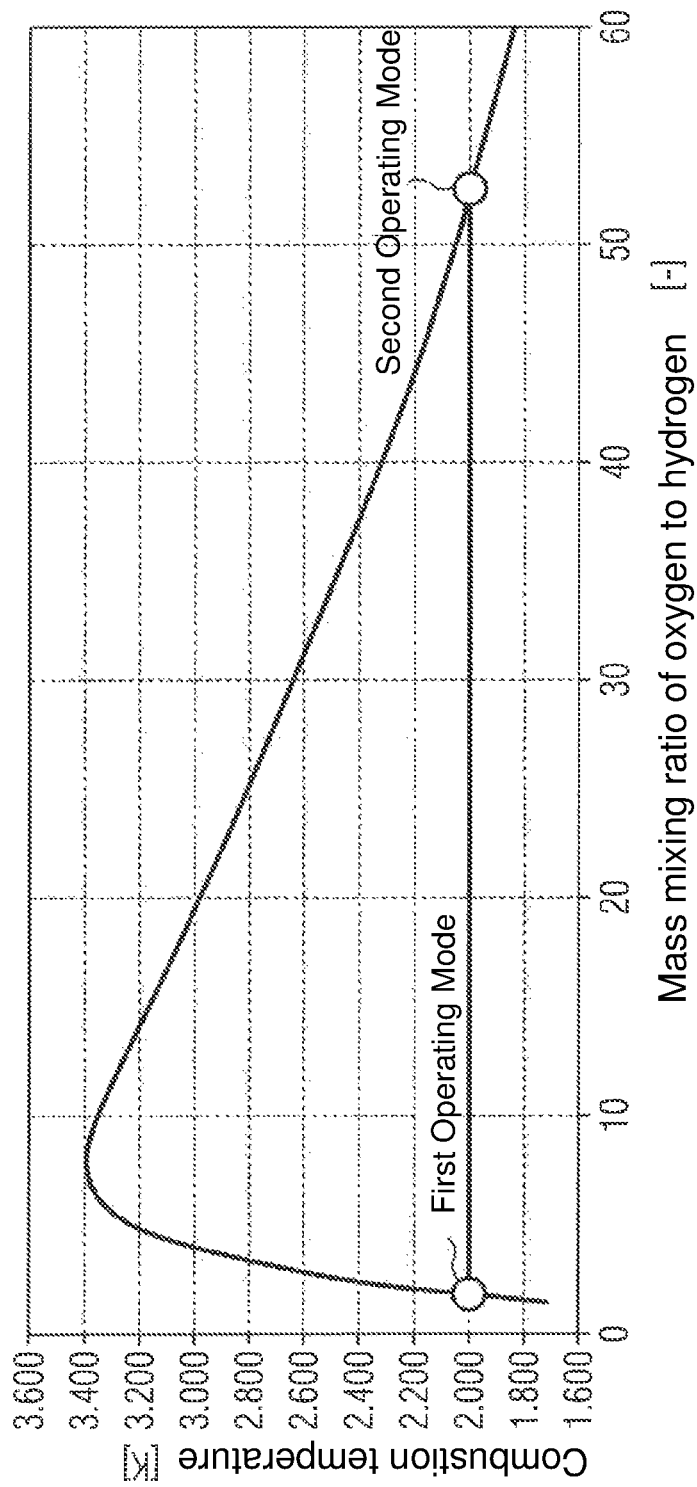
FIG. 2 shows a diagram that illustrates a connection between the combustion temperature in a combustion chamber and a mixture ratio of an oxygen-hydrogen mixture to be ignited in the combustion chamber.

FIG. 2 shows a diagram, which illustrates an exemplary operation of the rocket propulsion system 10 shown in FIG. 1 in the first operating mode and in the second operating mode of the rocket propulsion system 10. Here the combustion temperature in the combustion chamber 12 is shown as a function of the mass mixing ratio of oxygen to hydrogen of the oxygen-hydrogen mixture supplied to the combustion chamber 12. The abscissa of the diagram shows the mass mixing ratio of oxygen to hydrogen of the oxygen-hydrogen mixture supplied to the combustion chamber 12 and the ordinate of the diagram shows the combustion temperature in the combustion chamber 12 that arises due to combustion of the oxygen-hydrogen mixture supplied to the combustion chamber 12. As illustrated in FIG. 2, the combustion temperature in the combustion chamber 12 is at its highest during the combustion of a stoichiometric oxygen-hydrogen mixture, i.e., at a mass mixing ratio of oxygen to hydrogen of 8.

In the first operating mode of the rocket propulsion system 10, oxygen and hydrogen are supplied to the combustion chamber 12 in a mass mixing ratio of substantially 2. In the second operating mode of the rocket propulsion system 10, oxygen and hydrogen are supplied to the combustion chamber 12 in a mass mixing ratio of substantially 52. In the first and the second operating mode of the rocket propulsion system 10, the combustion temperature is 2000 K in each case.

Figure 3:
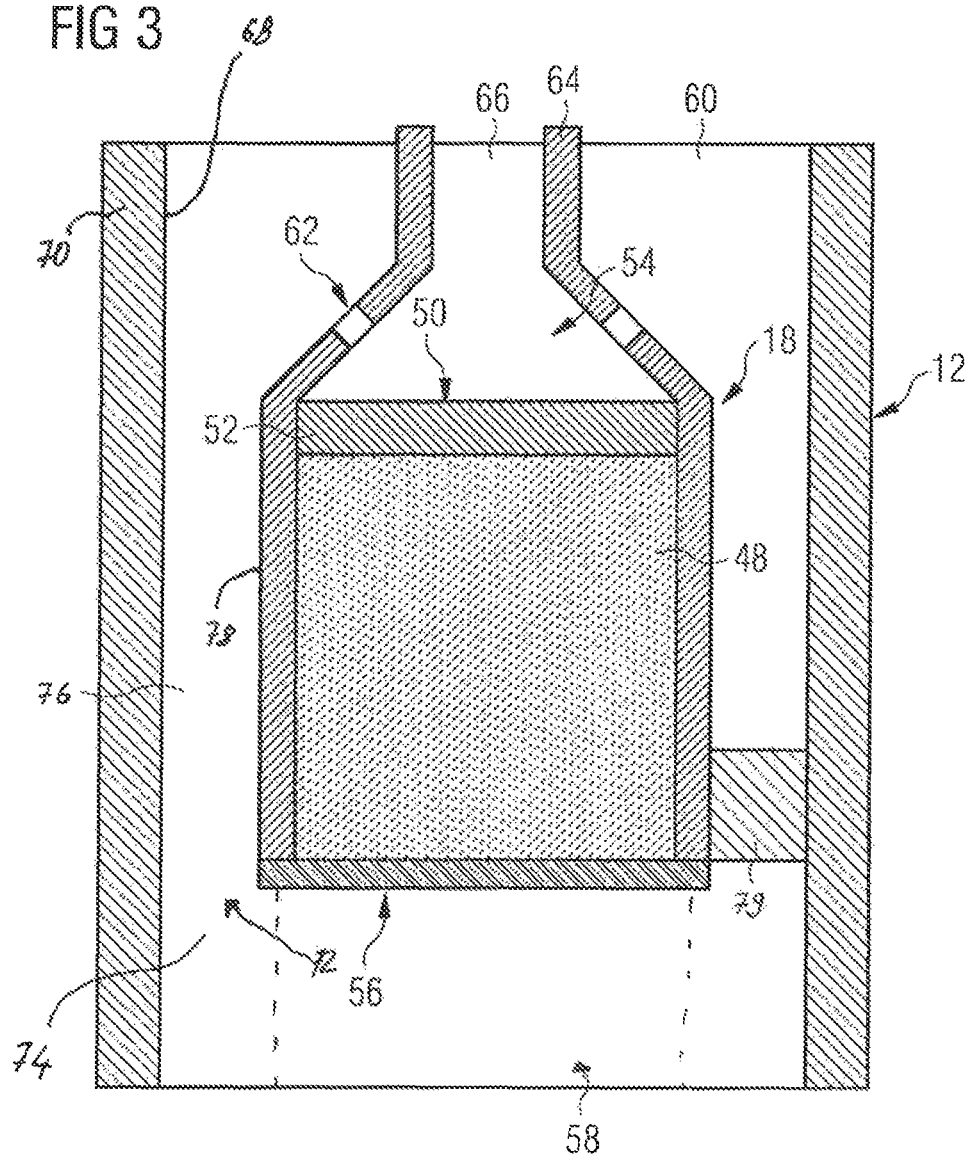
FIG. 3 shows an enlarged longitudinal section of a combustion chamber shown in FIG. 1 of the rocket propulsion system of a first embodiment.

FIG. 3 shows an enlarged longitudinal section of the combustion chamber 12 of the rocket propulsion system 10 shown in FIG. 1 with the ignition unit 18 arranged therein. The ignition unit 18 comprises a catalyst chamber 48 arranged in the combustion chamber 12, which catalyst chamber is configured to initiate the combustion of the oxygen-hydrogen mixture supplied to the combustion chamber 12.

The catalyst chamber 48 has an entrance area 50, via which oxygen and hydrogen supplied to the combustion chamber 12 can be supplied to the catalyst chamber 48. In the region of the entrance area 50 of the catalyst chamber 48, a flashback arrestor 52 is arranged in the catalyst chamber 48, which arrestor is configured to prevent ignition upstream of the catalyst chamber 48 of the oxygen-hydrogen mixture to be supplied to the catalyst chamber 48.

Upstream of the flashback arrestor 52, the ignition unit 18 further comprises a premixing chamber 54 for premixing the oxygen supplied to the ignition unit 18 and the hydrogen supplied to the ignition unit 18 prior to the supply of the oxygen-hydrogen mixture to the catalyst chamber 48. The premixing chamber 54 opens into the entrance area 50 to the catalyst chamber 48 and is arranged substantially perpendicular to this. A flow cross section of the premixing chamber 54 is formed so that it becomes larger in the direction of the entrance area 50 to the catalyst chamber 48, i.e., in the flow direction.

The catalyst chamber 48 further comprises an exit area 56, via which a combustion gas mixture produced in the catalyst chamber 48 of the ignition unit 18 can be supplied to a combustion section 58 of the combustion chamber 12 arranged downstream of the exit area 56 of the catalyst chamber 48.

The oxygen supply system 14 comprises an oxygen supply duct 60 arranged in the combustion chamber 12, via which duct a first portion of the oxygen supplied to the combustion chamber can be supplied to the premixing chamber 54 of the ignition unit 18 via an oxygen supply opening 62. The oxygen supply opening 62 for supplying oxygen to the premixing chamber 54 of the ignition unit 18 is formed in a premixing chamber wall 64 facing the oxygen supply duct 60.

The hydrogen supply system 16 comprises a hydrogen supply duct 66 arranged in the combustion chamber 12, via which the hydrogen supplied to the combustion chamber 12 can be supplied to the premixing chamber 54 of the ignition unit 18. The hydrogen supply duct 66 for supplying hydrogen to the premixing chamber 54 of the ignition unit 18 opens into the premixing chamber 54 and is arranged substantially perpendicular to the entrance area 50 of the catalyst chamber 48. In the embodiment of the rocket propulsion system 10 shown here, the hydrogen supply duct 66 has a circular cross section, wherein the hydrogen supply duct 66 passes through the oxygen supply duct 60. The oxygen supply duct 60 is formed accordingly in the form of an annular gap with an annular cross section.

The ignition unit 18 of the rocket propulsion system 10 is formed so that the premixing chamber wall 64 forms a catalyst chamber wall, the premixing chamber 54 and the hydrogen supply duct 66, wherein the oxygen supply duct 60 is arranged between an inner surface 68 of a combustion chamber wall 70 of the combustion chamber 12 and an outer surface of the catalyst chamber wall 64.

The rocket propulsion system 10 further comprises a cooling duct 72, which extends along the inner surface 68 of the combustion chamber wall 70. At least a portion of the oxygen supplied to the combustion chamber 12 can flow through the cooling duct 72. The cooling duct 72 further comprises a first section 74, which extends in the combustion section 58 of the combustion chamber 12 arranged downstream of the exit area 56 of the ignition unit 18 along the inner surface 68 of the combustion chamber wall 70.

The oxygen conducted through the cooling duct 72 flows, at least in sections, along the inner surface 68 of the combustion chamber wall 70 and thus forms a cooling film in the region of the cooling duct in the combustion section 58 of the combustion chamber 12, as illustrated by dashed lines in FIG. 3. In the combustion section 58 of the combustion chamber 12, the cooling film encloses a gas core formed by the combustion gases emerging from the ignition unit 18. The gas core has combustion temperatures in this case that are greater than temperatures prevailing in the combustion section 58 of the combustion chamber 12 in the region of the inner surface 68 of the combustion chamber wall 70.

The first section 74 of the cooling duct 72 is designed open in the direction of a central longitudinal axis of the combustion chamber 12. In other words, no separating wall is provided between the first section 74 of the cooling duct 72 and a further region of the combustion section 58 of the combustion chamber 12. Alternatively, a separating wall can be provided in the combustion section 58 of the combustion chamber 12, which wall separates the first section 74 of the cooling duct 72 from other regions of the combustion section 58 of the combustion chamber 12, at least in sections.

The cooling duct 72 further comprises a second section 76, which extends between an outer surface 78 of the ignition unit 18 and a section of the inner surface 68 of the combustion chamber wall 70 lying opposite the outer surface 78 of the ignition unit 18 and opens into the first section 74 arranged downstream of the exit area 56 of the ignition unit 18 in the combustion section 58 of the combustion chamber 12. The catalyst chamber 48 is accordingly enclosed, at least in sections, by the second section 76 of the cooling duct 72. In other words, the second section 76 of the cooling duct 72 is formed in the form of an annular gap with an annular flow cross section. Alternatively, a plurality of individual flow paths through which a parallel flow, in particular, is possible can be provided in the cooling duct 72, in particular in the second section 76 of the cooling duct 72.

In the embodiment shown here, the cooling duct 72 is connected to the oxygen supply system 14. In particular, the second section 76 of the cooling duct 72 is connected to the oxygen supply duct 60, wherein the oxygen supply duct 60 opens into the second section 76 of the cooling duct 72. The oxygen supply duct 60 of the oxygen supply system 14 is configured to conduct a second portion of the oxygen supplied to the combustion chamber 12 via the cooling duct 72 into the combustion section 58 of the combustion chamber 12.

Arranged in the second section 76 of the cooling duct 72 is a swirl generation means in the form of a swirler 79, which is configured to induce swirl in the oxygen to be supplied via the cooling duct 72 to the combustion section 58. The dwell time in the cooling duct 72 of the oxygen flowing through the cooling duct 72 can thus be increased. Alternatively, the swirl generation means can be provided in the form of tangentially positioned holes provided in the cooling duct 72, in particular the second section 76 of the cooling duct 72.

Figure 4:
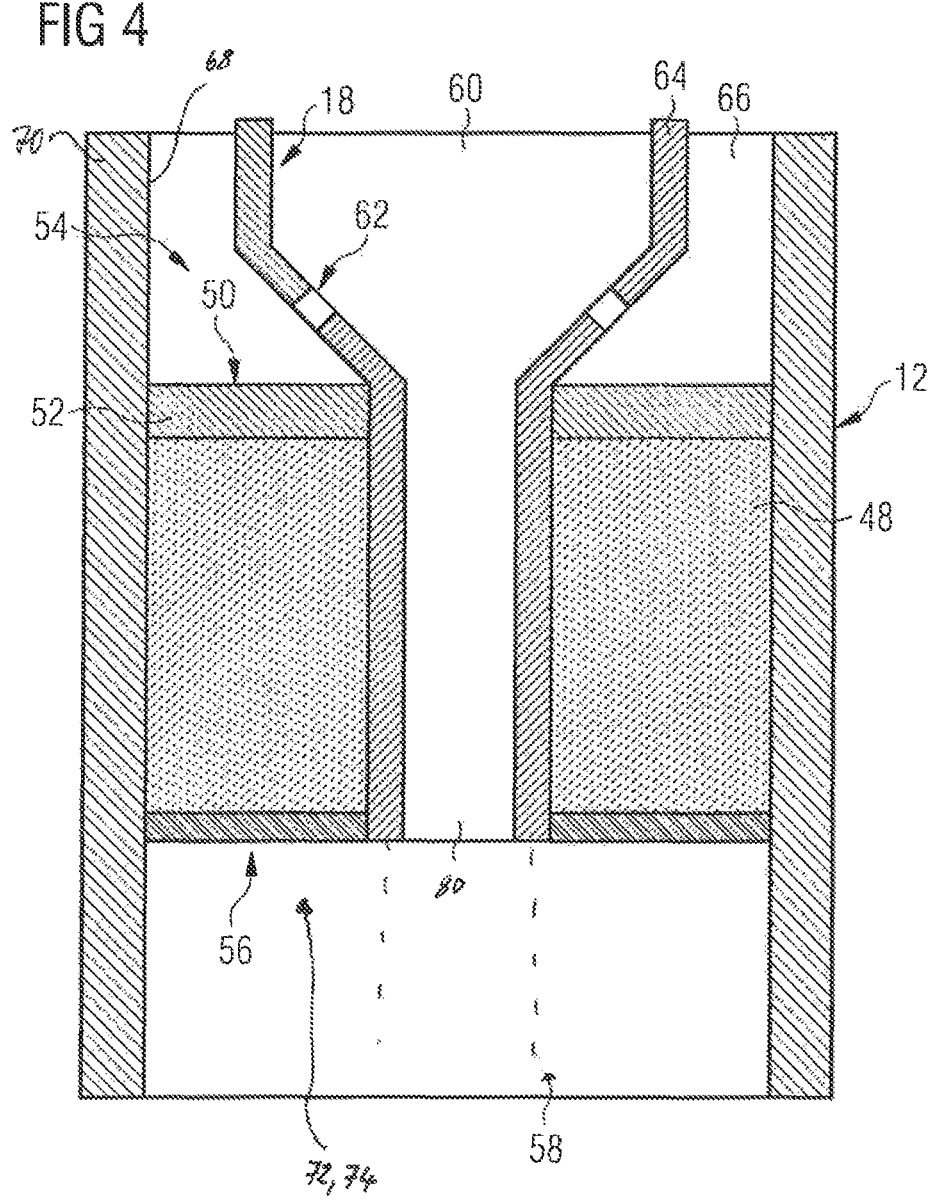
FIG. 4 shows a combustion chamber of the rocket propulsion system of a second embodiment.

A combustion chamber 12 of a second embodiment of the rocket propulsion system 10 is shown in FIG. 4. Compared with the embodiment shown in FIG. 3, a combustion gas mixture emerging from the ignition unit 18 can flow through the cooling duct 72 extending along the inner surface 68 of the combustion chamber wall 70. The cooling film formed along the inner surface 68 of the combustion chamber wall 70 in the combustion section 58 of the combustion chamber 12 in the region of the cooling duct 72 is accordingly formed by the combustion gases emerging from the ignition unit 18. The first section 74 of the cooling duct 72 is connected here to the exit area 56 of the ignition unit 18, wherein the exit area 56 of the ignition unit 18 opens into the first section 74 of the cooling duct 72 and is arranged perpendicular to this.

A core duct 80 passes through the ignition unit 18, at least in sections, through which duct a portion of the oxygen supplied to the combustion chamber 12 can flow and which conducts this into the combustion section 58 of the combustion chamber 12. To this end, the core duct 80 is connected to the oxygen supply duct 60 of the oxygen supply system 14, wherein the oxygen supply duct 60 opens into the core duct 80. The core duct 80 further opens into the combustion section 58 of the combustion chamber 12.

The core duct 80 is configured to conduct the oxygen flowing through the core duct 80 along an internal outer surface of the catalyst chamber 48 formed by the catalyst chamber wall 64. Furthermore, the core duct 80 is formed so that the oxygen supplied to the combustion section 58 of the combustion chamber 12 via the core duct 80 forms an oxidizer-rich gas core in the combustion section 58 of the combustion chamber 12, which is enclosed by the cooling film formed by the cooling duct 74. The oxidizer-rich gas core formed in this way has locally higher combustion temperatures compared with the cooling film formed along the inner surface 68 of the combustion chamber wall 70. In other words, thermal insulation can be provided between the gas core having high combustion temperatures and the combustion chamber wall by the cooling film enclosing the gas core. The thermal load on the combustion chamber wall 70 during operation of the rocket propulsion system 10 can thus be reduced.

Figure 5:
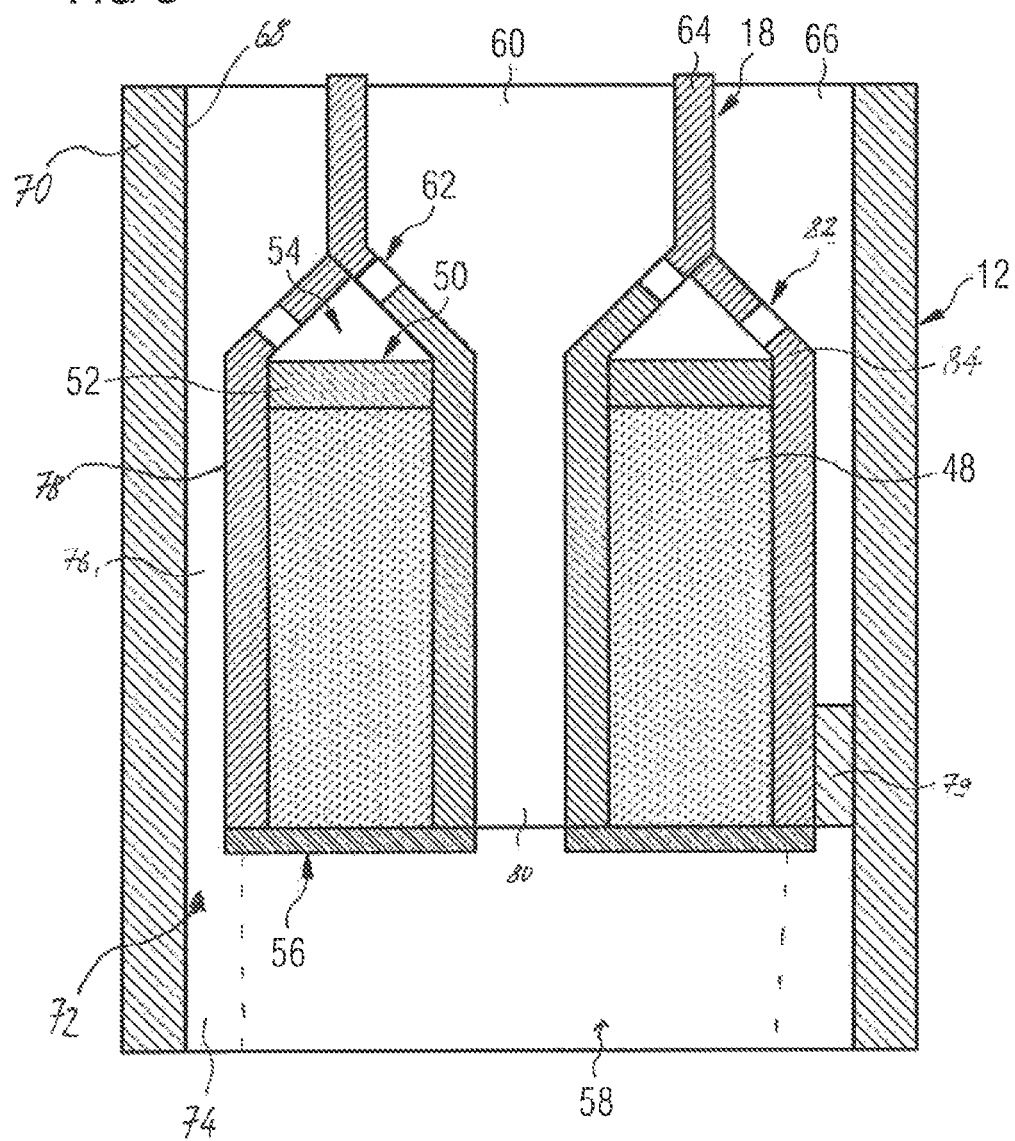
FIG. 5 shows a combustion chamber of the rocket propulsion system of a third embodiment.

FIG. 5 shows an enlarged longitudinal section of the combustion chamber 12 shown in FIG. 1 of a rocket propulsion system 10 of a third embodiment. In the embodiment shown here, at least a portion of the hydrogen supplied to the combustion chamber can flow along the cooling duct 72 extending along the inner surface 68 of the combustion chamber wall 70. The cooling film formed along the inner surface 68 of the combustion chamber wall 70 in the combustion section 58 of the combustion chamber 12 in the region of the cooling duct 72 is accordingly formed by the hydrogen flowing through the cooling duct 72. To this end the cooling duct 72 is connected to the hydrogen supply system 16.

The hydrogen supply duct 66 of the hydrogen supply system 16 is configured to conduct a first portion of the hydrogen supplied to the combustion chamber 12 into the ignition unit 18 and a second portion of the hydrogen supplied to the combustion chamber 12 via the cooling duct 72 into the combustion section 58 of the combustion chamber 12.

The first portion of the hydrogen supplied to the combustion chamber 12 can be supplied to the premixing chamber 54 of the ignition unit 18 via a hydrogen supply opening 82. The hydrogen supply opening 82 for supplying hydrogen to the premixing chamber 54 of the ignition unit 18 is formed in another, outer premixing chamber wall 84 facing the hydrogen supply duct 66.

To supply the second portion of the hydrogen supplied to the combustion chamber 12 to the combustion section 58 of the combustion chamber 12, the second section 76 of the cooling duct 72 is connected to the hydrogen supply duct 66 of the hydrogen supply system 16, wherein the hydrogen supply duct 66 opens into the second section 76 of the cooling duct 72.

The core duct 80, through which the second portion of the oxygen supplied to the combustion chamber 12 can flow and which conducts this into the combustion section 58 of the combustion chamber 12, passes here through the catalyst chamber 48 of the ignition unit 18.

The cooling duct 72 is formed so that the hydrogen supplied to the combustion section 58 of the combustion chamber 12 via the cooling duct 72 forms a reactive, low-oxidizer cooling film on the inner surface of the combustion chamber wall 70 in the combustion section 58 of the combustion chamber 12. This has the effect that the gas core formed by the core duct 80 and the ignition unit 18, which has higher combustion temperatures compared with the cooling film, is enclosed by the cooling film. The thermal load on the combustion chamber wall 70 during operation of the rocket propulsion system 10 can thus be reduced.

Figure 6:
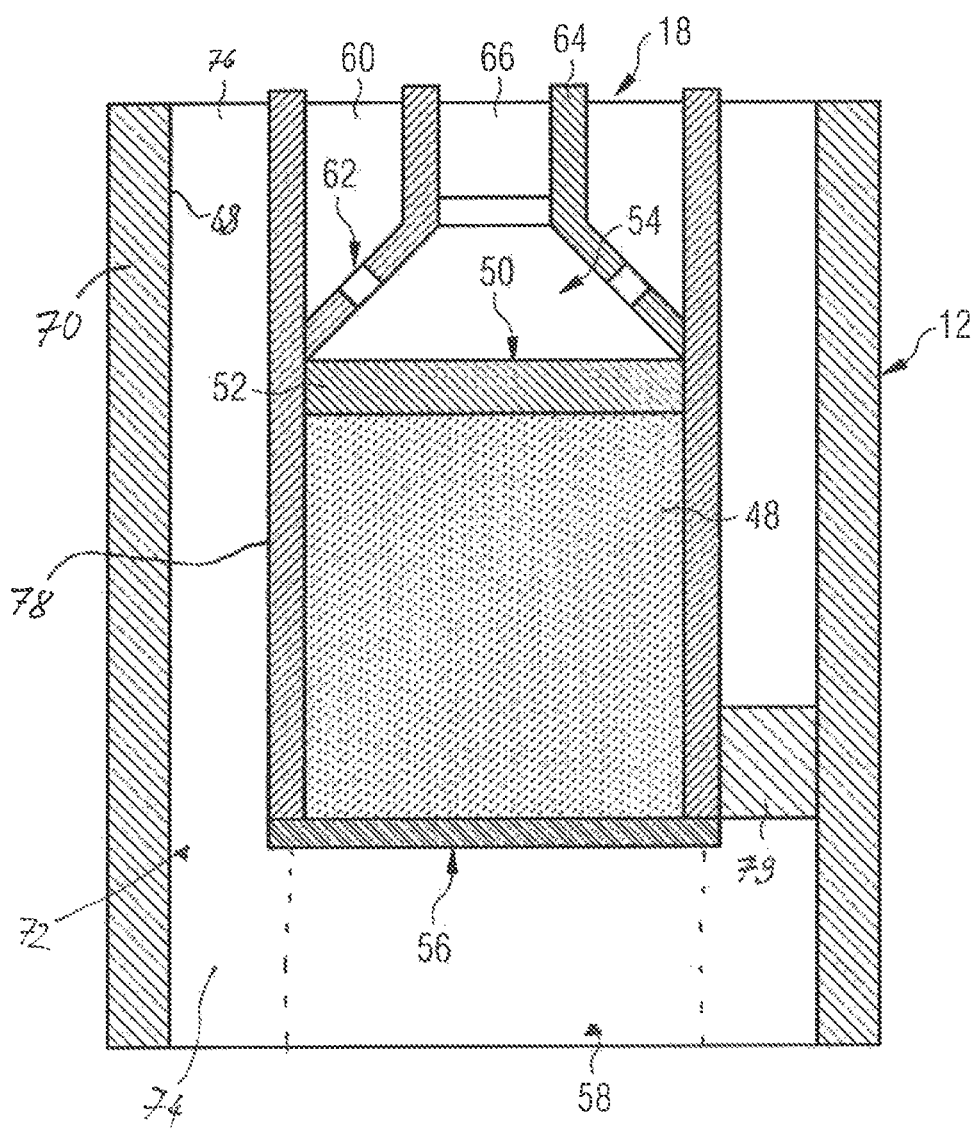
FIG. 6 shows a combustion chamber of the rocket propulsion system of a fourth embodiment.

FIG. 6 shows a combustion chamber 12 of a fourth embodiment of the rocket propulsion system 10, which differs from the embodiment shown in FIG. 3 due to the design of the cooling duct 72.

The cooling duct 72 is formed so that the second section 76 of the cooling duct 72 branches off from the oxygen supply duct 60 upstream of the ignition unit 18 in a region of the combustion chamber 12 that is not shown here. In this case the second section 76 of the cooling duct 72 runs in a partial area parallel to the oxygen supply duct 60.

The control unit 20 of the rocket propulsion system 10 can be configured to control the oxygen supply system 14, the hydrogen supply system 16 and the ignition unit 18 so that the oxygen mass flow flowing through the cooling duct 72 is varied in the first operating mode and the second operating mode of the rocket propulsion system 10. In particular, the control unit 20 can be configured to control the oxygen supply system 14, the hydrogen supply system 16 and the ignition unit 18 so that oxygen flows through the cooling duct 72 only in the second operating mode of the rocket propulsion system 10.

In an alternative embodiment of the combustion chamber 12 shown here, the arrangement of the oxygen supply duct 60 and the hydrogen supply duct 66 can be swapped, so that the oxygen supply duct 60 opens into the premixing chamber 54, wherein the premixing chamber 54 can continue to be supplied with hydrogen via the opening 62 in the premixing chamber wall 64. The second section 76 of the cooling duct 72 can accordingly branch off from the hydrogen supply duct 66 and run in particular along at least a partial section parallel to the hydrogen supply duct 66.

FIG. 7 shows an enlarged longitudinal section of the combustion chamber 12 shown in FIG. 1 of the rocket propulsion system 10 of a fifth embodiment, in which the formation of the core duct 80 differs from the embodiment of the rocket propulsion system 10 shown in FIG. 4.

In the combustion chamber 12 shown here of the rocket propulsion system 10, the core duct 80 is formed so that this branches off from the oxygen supply duct 60 upstream of the ignition unit 18 in a region of the combustion chamber 12 not shown here. The core duct 80 runs parallel to the oxygen supply duct 60 at least in a partial area.

The control unit 20 can be configured to control the oxygen supply system 14, the hydrogen supply system 16 and the ignition unit 18 so that the oxygen mass flow flowing through the core duct 80 is varied in the first operating mode and the second operating mode of the rocket propulsion system 10. In particular, the control unit 20 can be configured to control the oxygen supply system 14, the hydrogen supply system 16 and the ignition unit 18 so that oxygen flows through the core duct 80 only in the second operating mode of the rocket propulsion system 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rocket propulsion system comprising: a combustion chamber;
    an oxygen supply system, which comprises an oxygen supply duct and is configured to supply oxygen to the combustion chamber;
    a hydrogen supply system, which comprises a hydrogen supply duct and is configured to supply hydrogen to the combustion chamber;
    an ignition unit, to which at least a portion of the oxygen supplied to the combustion chamber and at least a portion of the hydrogen supplied to the combustion chamber is configured to be supplied and which is configured to initiate combustion of the oxygen-hydrogen mixture in the combustion chamber, wherein the ignition unit comprises a catalyst chamber and a premixing chamber for premixing the portion of oxygen supplied to the ignition unit and the portion of hydrogen supplied to the ignition unit prior to supplying the oxygen-hydrogen mixture to the catalyst chamber, wherein the premixing chamber is arranged upstream of an entrance area to the catalyst chamber, and wherein a flow cross section of the premixing chamber for the gases to be supplied to the catalyst chamber becomes larger in a direction of the entrance area of the catalyst chamber, and
    a cooling duct, which extends along an inner surface of a combustion chamber wall wherein the cooling duct comprises a section, which extends between an outer surface of the ignition unit and a section of the inner surface of the combustion chamber wall lying opposite an outer surface of the ignition unit and opens into the combustion section of the combustion chamber arranged downstream of an exit area of the ignition unit, wherein a swirler is arranged in said section of the cooling duct and wherein the cooling duct is configured to be flown through with one of
        at least a portion of the oxygen supplied to the combustion chamber from the oxygen supply duct, wherein the oxygen supply duct extends along the inner surface of the combustion chamber wall such that the section of the cooling duct extends from the oxygen supply duct;
at least a portion of the hydrogen supplied to the combustion chamber from the hydrogen supply duct, wherein the hydrogen supply duct extends along the inner surface of the combustion chamber wall such that the section of the cooling duct extends from the hydrogen supply duct; or
a combustion gas mixture emerging from the ignition unit; and
wherein an oxygen supply opening for supplying oxygen to the premixing chamber is formed in a wall of the premixing chamber that at least partially defines the oxygen supply duct; or
a hydrogen supply opening for supplying hydrogen to the premixing chamber is formed in a wall of the premixing chamber that at least partially defines the hydrogen supply duct.

2. The rocket propulsion system according to claim 1, wherein the cooling duct comprises a further section, which extends in a combustion section of the combustion chamber arranged downstream of the exit area of the ignition unit along the inner surface of the combustion chamber wall.

3. The rocket propulsion system according to claim 1, wherein at least one of:
the section of the cooling duct is connected to the oxygen supply dud of the oxygen supply system or the hydrogen supply duct of the hydrogen supply system, or
a plurality of individual flow paths, through which a parallel flow is possible, are provided in the cooling duct.

4. The rocket propulsion system according to claim 3, wherein
the oxygen supply duct or the hydrogen supply duct open into the section of the cooling duct, or
the section of the cooling duct branches off from the oxygen supply duct or the hydrogen supply duct and runs along at least a partial area parallel to the oxygen supply duct or the hydrogen supply duct.

5. The rocket propulsion system according to claim 1, wherein:
a flashback arrestor is arranged in the region of an entrance area to the catalyst chamber; or
the hydrogen supply duct for supplying hydrogen to the premixing chamber opens into the premixing chamber.

6. The rocket propulsion system according to claim 1, wherein a core duct passes through the ignition unit, at least in sections, which the core duct is connected to the oxygen supply duct of the oxygen supply system.

7. The rocket propulsion system according to claim 6, wherein the oxygen supply duct opens into the core duct.

8. The rocket propulsion system according to claim 1, further comprising:
a control unit configured to control the oxygen supply system and the hydrogen supply system so that the rocket propulsion system is operated alternately in a first operating mode, in which oxygen and hydrogen are supplied to the combustion chamber in a first mass mixing ratio of oxygen to hydrogen, and in a second operating mode, in which oxygen and hydrogen are supplied to the combustion chamber in a second mass mixing ratio of oxygen to hydrogen that is greater than the first mass mixing ratio.

9. A method for operating a rocket propulsion system, comprising:
supplying oxygen to a combustion chamber via an oxygen supply duct;
supplying hydrogen to the combustion chamber via a hydrogen supply duct;
conducting at least a portion of the oxygen supplied to the combustion chamber and at least a portion of the hydrogen supplied to the combustion chamber into an ignition unit, wherein the ignition unit comprises a catalyst chamber and a premixing chamber for premixing the portion of oxygen supplied to the ignition unit and the portion of hydrogen supplied to the ignition unit prior to supplying the oxygen-hydrogen mixture to the catalyst chamber, wherein the premixing chamber is arranged upstream of an entrance area to the catalyst chamber, and wherein a flow cross section of the premixing chamber for the gases to be supplied to the catalyst chamber becomes larger in a direction of the entrance area of the catalyst chamber;
initiation of combustion of the oxygen-hydrogen mixture in the combustion chamber via the ignition unit; and
conducting at least a portion of the oxygen supplied to the combustion chamber, at least a portion of the hydrogen supplied to the combustion chamber, or a combustion gas mixture emerging from the ignition unit through a cooling duct, the cooling duct extending along an inner surface of a combustion chamber wall;
wherein the cooling duct comprises a section, which extends between an outer surface of the ignition unit and a section of the inner surface of the combustion chamber wall lying opposite an outer surface of the ignition unit and opens into the combustion section of the combustion chamber arranged downstream of an exit area of the ignition unit, wherein a swirler is arranged in said section of the cooling duct; and
wherein an oxygen supply opening for supplying oxygen to the premixing chamber is formed in a wall of the premixing chamber at least partly defining, the oxygen supply duct and wherein the oxygen supply duct extends along the inner surface of the combustion chamber such that the section of the cooling duct extends from the oxygen supply duct; or
a hydrogen supply opening for supplying hydrogen to the premixing chamber is formed in a wall of the premixing chamber at least partly defining the hydrogen supply duct and wherein the hydrogen supply duct extends along the inner surface of the combustion chamber such that the section of the cooling duct extends from the hydrogen supply duct.

10. The method according to claim 9, wherein
the cooling duct comprises a first section, which extends in a combustion section of the combustion chamber arranged downstream of the exit area of the ignition unit along the inner surface of the combustion chamber wall.

11. The method according to claim 9, wherein at least one of:
the section of the cooling duct is connected to an oxygen supply duct of an oxygen supply system or a hydrogen supply duct of a hydrogen supply system; or
a plurality of individual flow paths, through which a parallel flow is possible, are provided in the cooling duct.

12. The method according to claim 11, wherein
the oxygen supply duct or the hydrogen supply duct opens into the section of the cooling duct, or
the section of the cooling duct branches off from the oxygen supply duct or the hydrogen supply duct and runs along at least a section parallel to the oxygen supply duct or the hydrogen supply duct.

13. The method according to claim 9, wherein a core duct, through which oxygen to be supplied to the combustion chamber is conducted, passes through the ignition unit, at least in sections.

* * * * *